A. O. SLENTZ.
TURN TABLE.
APPLICATION FILED SEPT. 16, 1910.
1,013,456. Patented Jan. 2, 1912.
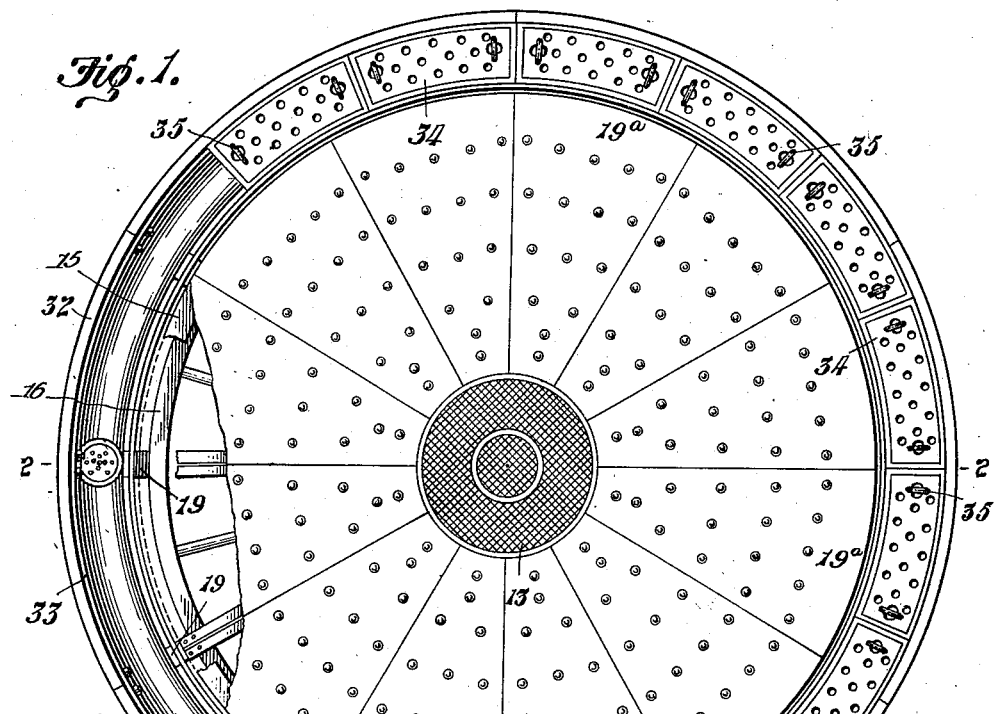
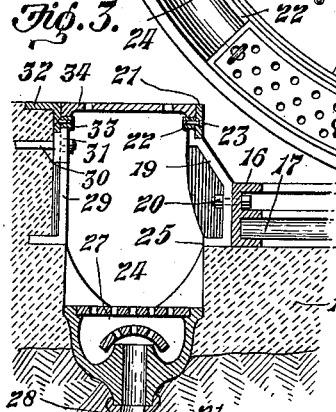
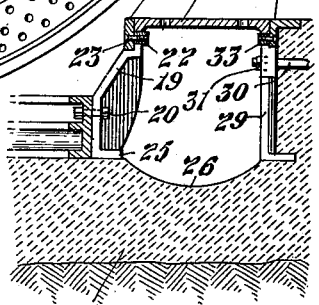
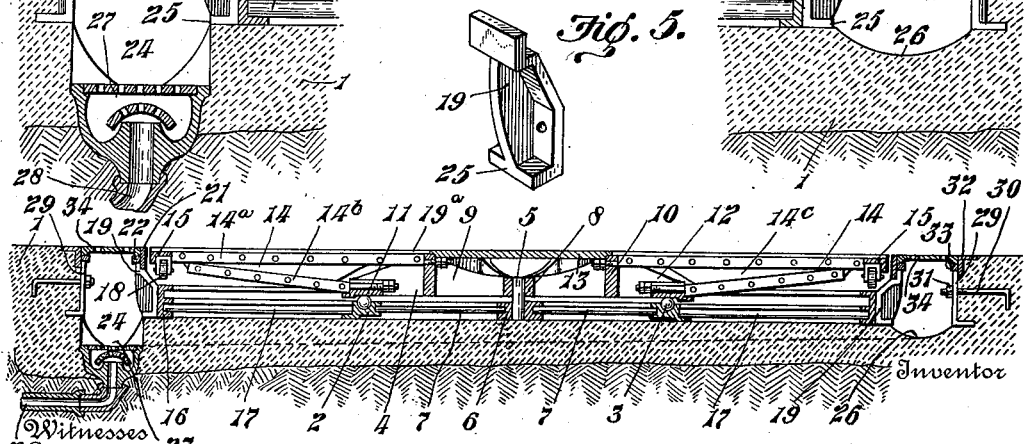
Witnesses
Sylvia Boron.
J. A. Bishop.
Inventor
Albertus O. Slentz.
By Bond & Miller
Attorneys
COLUMBIA PLANOGRAPH CO., WASHINGTON, D. C.

UNITED STATES PATENT OFFICE.

ALBERTUS O. SLENTZ, OF CANTON, OHIO, ASSIGNOR TO THE CANTON FOUNDRY AND MACHINE COMPANY, OF CANTON, OHIO, A CORPORATION OF OHIO.

TURN-TABLE.

1,013,456.  Specification of Letters Patent.  Patented Jan. 2, 1912.

Application filed September 16, 1910. Serial No. 582,339.

*To all whom it may concern:*

Be it known that I, ALBERTUS O. SLENTZ, a citizen of the United States, residing at Canton, in the county of Stark and State of Ohio, have invented a new and useful Turn-Table, of which the following is a specification.

My invention relates to turn tables such as are used in automobile garages and other instances where it is desired to have a turn table constructed flush with the floor.

It is the general practice in automobile garages to place the automobile upon the turn table when it is desired to clean the automobile, and a great amount of dirt and sand washed from the automobile is washed over the edge of the turn table and collects beneath the said turn table, thereby making it necessary to frequently remove sections of the turn table in order to clean out said accumulation of dirt.

My invention relates especially to a means whereby the dirt and sand washed from an automobile will be carried over the outer edge of the turn table and deposited in a circular groove of slightly greater diameter than the periphery of the turn table, and may be easily and readily removed without the necessity of dismantling the turn table proper. This device is preferably used in combination with a knock down turn table such as shown and described in my allowed application, Serial No. 574,630 filed July 30, 1910, although with slight alteration it could be used in conjunction with any suitable form of turn table.

The objects of my invention are to generally improve devices of the character mentioned; to construct a turn table having a receiving channel located around its periphery adapted to receive the dirt washed from said turn table and to provide means whereby said dirt may be easily and readily removed from said receiving channel.

These and other objects apparent to those skilled in the art, I attain by the construction illustrated in the accompanying drawing, although my invention may be embodied in other forms, the construction illustrated being chosen by way of example.

Figure 1 is a top plan view of a turn table constructed in accordance with my invention, with parts broken away and some of the cover plates removed to show the peripheral channel and the drain pipe connected therewith. Fig. 2 is a section taken on line 2—2 of Fig. 1. Fig. 3 is an enlarged sectional view of the peripheral channel and parts adjacent thereto, showing the drain pipe connection. Fig. 4 is a view similar to Fig. 3 taken at a point opposite to Fig. 3. Fig. 5 is a perspective view of one of the inner supporting brackets.

Similar numerals of reference indicate corresponding parts in all the figures of the drawing.

In the drawing, 1 represents the cement lining designed to properly cover the bottom of the turn table pit and the vertical walls thereof. Upon the bottom of the pit is located the inner fixed track 2, which track is provided upon its upper surface with a ball race adapted to receive a series of antifriction balls 3, which balls are adapted to normally carry the weight of the rotatable portion of the turn table. Directly above the track 2 is located the turn table support proper 4, which is circular in form and of a diameter corresponding substantially with the diameter of the circular track 2 so that said turn table support will ride upon the balls 3 as illustrated in Fig. 2. For the purpose of holding the support 4 in proper relation with reference to the track 2 the fixed center post 5 is provided which center post is secured to the hub 6, which hub is held by means of the spokes 7. The center post is extended into the hub 8, which hub is formed at the junction of the webs 9. The turn table support 4 is composed of said hub 8, the inner cylindrical member 10 and the outer ring member 11, all joined together by means of said webs 9 and the webs 12. A center plate 13 is supported upon the inner cylindrical member 10. A number of trusses 14 are connected at their inner ends to the cylindrical member 10 and the ring member 11, each of said trusses comprising a relatively long horizontal upper cord $14^a$ and a relatively short inclined lower cord $14^b$ connected together by a plate $14^c$. To the outer ends of the trusses are connected a series of segments 15, which segments when properly connected together constitute a ring rotatable with the turn table proper. Below this ring is located the fixed outer track 16 which is formed of a diameter corresponding substantially with the diameter of the ring made up of the segments 15. The track 16 is held in proper concentric position by the spokes 17. To the lower face of the ring made up of the segments 15 are attached the casters 18, which casters are normally held slightly elevated and out of contact with the track 16, but are adapted to be lowered and caused to bear upon the track 16 in the event of a heavy weight being placed upon the turn table near the periphery thereof, thus relieving the structure of undue strain. The sector shaped plates 19$^d$ are mounted upon the trusses 14.

Although it is preferable to use the device just described in combination with my draining channel it will be understood that this construction of the turn table is not essential as many other forms of turn table can be provided with the draining channel forming the subject matter of this application.

At intervals around the outer track 16 are attached the brackets 19, by means of the bolts 20. The ring 21 is mounted upon said brackets and is provided with a flange 22, preferably made up of segments and attached to said ring as by the screws 23. A circular channel 24 is formed in the cement 1, the inner periphery of said channel being flush with the feet 25 of the brackets 19, said channel 24 being inclined downwardly from a point 26 to the basin 27. Connected to the basin 27 is the outlet pipe 28. If desired a number of basins may be provided at intervals around the channel, said channel being so constructed as to drain into the different basins. Located at intervals around the outer periphery of the channel 24 are the brackets 29, said brackets being held in place within the cement lining by means of the anchor bolts 30, provided with the nuts 31. Supported upon the top of the brackets 29 is a ring composed of segments of angle iron 32 to which ring is attached a supporting flange 33 similar to the flange 32. The perforated plates 34 are adapted to rest upon the supporting flanges 22 and 33 and are provided with the flush drop handles 35 by means of which they may be readily removed.

When an automobile is placed upon the turn table to be washed the water and mud washed from the automobile will find no way of escape except through the perforations in the plates 34 where it will drip into the channel 24 a great part of it being carried off through the waste pipe 28. By this construction there will be no accumulation of mud and water upon the cement bed beneath the turn table proper, thereby making it necessary to take the turn table apart at intervals in order to clean the same.

It will be understood that where a number of automobiles are cleaned upon a single turn table a great amount of dirt will accumulate in the channel 24, making it necessary to clean said channel. It is only necessary in this case to remove the perforated plates 24 when the channel can easily be cleaned by means of a round nosed shovel or other suitable implement. As the plates 34 are provided with the flush drop handles and are not secured in any way to the frame work of the turn table but merely rest upon the supporting flanges 22 and 33 it will be seen that they can be very readily removed and replaced, the whole operation of cleaning the channel occupying a very short time.

I claim:

1. A turn table of the character described provided with a circular channel located around its periphery.

2. A turn table of the character described provided with a circular channel located around its periphery, and means for draining said channel.

3. A turn table comprising a rotatable platform, a circular channel located around the periphery of said platform and an outlet pipe located in said channel, said channel inclined toward said outlet pipe.

4. A turn table comprising a rotatable platform and an inclined circular channel located around the periphery of said platform.

5. A turn table comprising a rotatable platform, an inclined circular channel located around the periphery of said platform and a drain pipe located at the lowest point of said channel.

6. A turn table comprising a rotatable platform, a circular channel located around the periphery of said platform and a removable cover for said channel.

7. A turn table comprising a rotatable platform, a circular channel located around the periphery of said platform and an annular series of plates located above said channel and flush with said platform.

8. A turn table comprising a rotatable platform, an annular series of perforated plates located around the periphery of said platform, a circular channel located beneath said annular series of plates and means for draining said channel.

9. A turn table comprising a rotatable platform, a circular channel located around the periphery of said platform and a perforated cover for said channel.

10. A turn table comprising a rotatable platform, an inclined circular channel located around the periphery of said platform, a pair of annular flanges located above said circular chamber and an annular series of perforated plates adapted to rest upon said annular flanges.

11. A turn table comprising a rotatable platform, and an inclined circular channel located around the periphery of said platform, the bottom of said channel being rounded in cross section.

12. A turn table comprising a rotatable platform, an inclined circular channel located around the periphery of said platform, the bottom of said channel being rounded in cross section, and a series of removable perforated plates located above said channel.

13. A turn table comprising a rotatable platform, an inclined circular channel located around the periphery of said platform, a series of removable perforated plates located above said channel and a drain pipe located at the lowest point of said channel.

In testimony that I claim the above, I have hereunto subscribed my name in the presence of two witnesses.

ALBERTUS O. SLENTZ.

Witnesses:
JOHN H. SPONSELLER,
F. W. BOND.

Copies of this patent may be obtained for five cents each, by addressing the "Commissioner of Patents, Washington, D. C."